Dec. 13, 1966  K. O. JOHNSON  3,291,397
ROCKET NOZZLE LINER RING MOUNTING
Filed Feb. 11, 1963
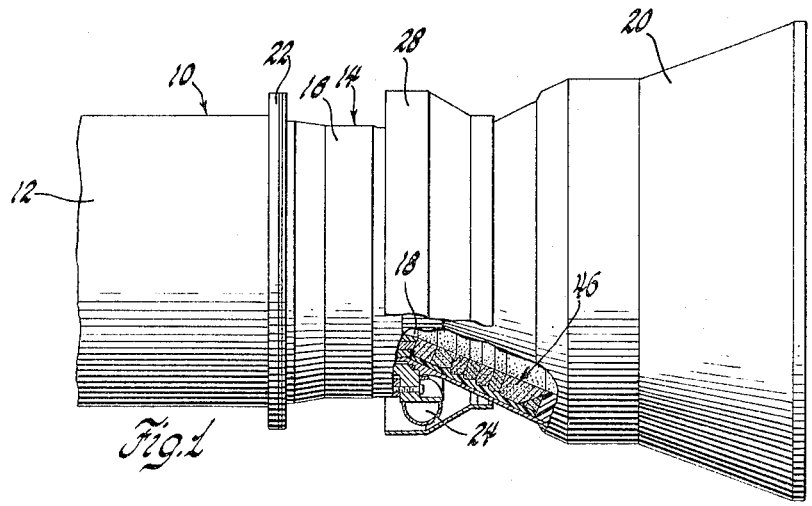
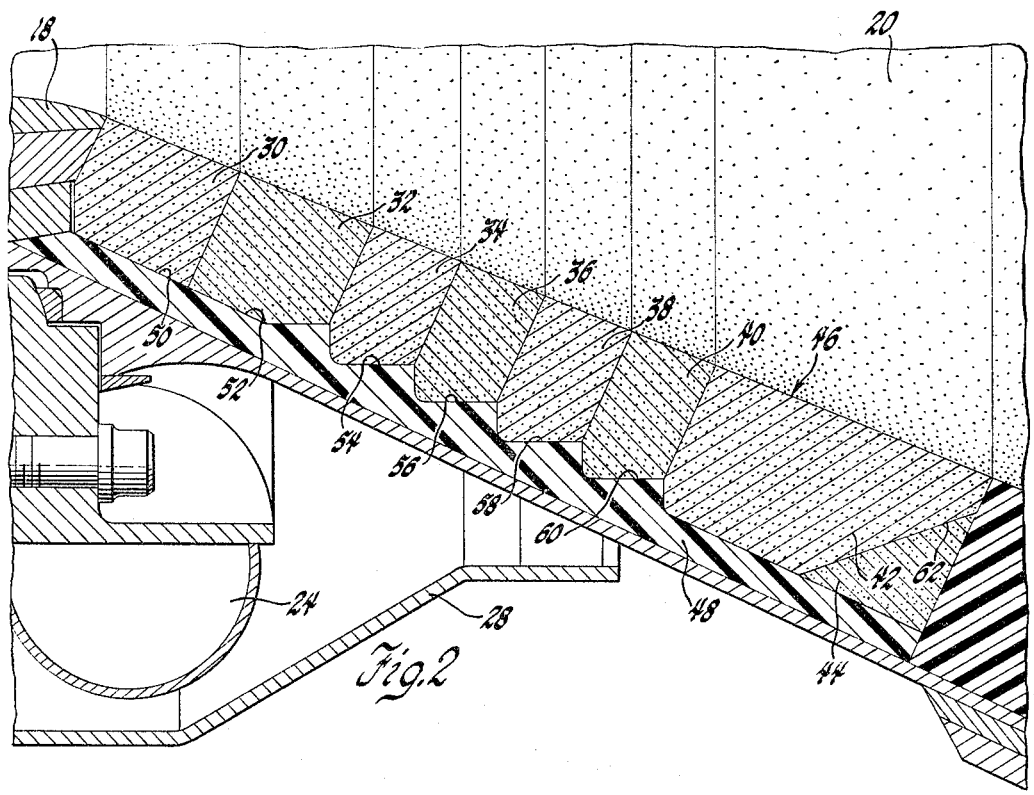
INVENTOR.
Kenneth O. Johnson
BY
Paul Fitzpatrick
ATTORNEY

United States Patent Office 3,291,397
Patented Dec. 13, 1966

3,291,397
ROCKET NOZZLE LINER RING MOUNTING
Kenneth O. Johnson, Camby, Ind., assignor to General Motors Corporation, Detroit, Mich., a corporation of Delaware
Filed Feb. 11, 1963, Ser. No. 258,665
3 Claims. (Cl. 239—591)

This invention relates to rocket engine nozzle constructions and, more particularly, it releates to a nozzle construction having a load balancing system.

Because of the extreme temperatures and thrust forces developed in modern day rocket engines, many failures have occurred in the exit cone of the rocket nozzles. It is felt that these recent nozzle failures have been due to high axial loads caused by restrained axial and radial growth of the nozzle liner. Therefore, it is clear that an exhaust nozzle liner system is needed which will reduce these high axial loads and restrict the possibilities of failures in the nozzle.

Therefore, it is the object of this invention to provide a nozzle liner system which will absorb part of the thermal expansion thereof to reduce the axial load sufficiently to prevent failure in exhaust nozzles of minimum weight.

It is a further object of this invention to provide a nozzle liner system that will prevent separation between liner rings that is also a result of axial and radial expansion.

Other objects, features and advantages of the invention will become apparent upon reference to the succeeding detailed description of the invention and the drawing illustrating the preferred embodiment thereof, wherein;

FIGURE 1 is a schematic illustration of the rocket engine with the nozzle liner portion shown in cross section; and FIGURE 2 is an enlarged cross sectional view of the nozzle liner system of FIGURE 1.

In general, this invention relates to a rocket engine nozzle liner construction having a plurality of carbon ring inserts as a ring spring device to absorb the axial the gases flowing through the nozzle. The nozzle construction features the use of the last two downstream ring inserts as a ring spring device to absorb the axial load in excess of that required to prevent separation of any two rings. The axial loading is the result of the thermal expansion of the nozzle liner ring inserts. The unique combination of seating arrangements for the nozzle liner carbon ring inserts enables the system to compensate for both radial and axial expansion.

More specifically, FIGURE 1 shows the rocket engine with the nozzle insert structure in section. The rocket engine 10 includes a combusion chamber 12 and an exhaust nozzle 14 having a converging inlet portion 16, a veturi or throat portion 18, and a diverging exit cone 20. The converging inlet portion 16 of the nozzle 14 is connected to the combustion chamber housing by any suitable means, such as the ring nut shown at 22. The exit cone portion 20 of the nozzle is mounted on the converging inlet portion 16 so that it can swivel, thereby providing vectoring action. This action is permitted by any suitable support indicated at 24. This support 24 permits the exit cone 20 to rotate within the main nozzle housing 28. Further details of the rocket engine and the rotatable nozzle mounting structure are not pertinent to the invention.

The subject of the invention, the nozzle liner insert construction, is shown in detail in FIGURE 2. The subject structure comprises eight carbon ring inserts numbered 30 through 44 which line and form a portion of the nozzle surface configuration 46. It is seen in FIGURE 2 that the plurality of carbon ring inserts, 30 through 44, are located in the exit cone portion 20 directly after the throat portion 18. Each of the nozzle liner ring inserts are seated within the nozzle liner structure 48, which is a plastic substance. A material commonly used in such an environment is Refrasil. The first two rings, 30 and 32, are received on conical surfaces 50 and 52. The next four ring inserts, 34 through 40, are received radially on cylindrical surfaces 54 through 60. The seventh ring, 42, is partially supported by the plastic substance 48 and by the triangular ring insert 44. The combination of the seventh ring 42 and the triangular ring 44 provide the aforementioned ring spring device.

This combination of nozzle liner ring inserts and supporting structure is chosen so that both radial expansion and axial expansion are counteracted. The four ring inserts 34 through 40 expand radially and this loading is absorbed by the outer nozzle structure and by the plastic substance 48 such that radial expansion of the rings does not contribute to the axial loading. Under the influence of the hot exhaust gases passing through the nozzle, the carbon inserts undergo a rise in temperature of 4000 to 5000 degrees in 5 or 10 seconds. This causes a considerable expansion in the ring inserts during a short period of time. This expansion must be counteracted in order to avoid a stress failure in the nozzle structure. Because of the lack of room, the first two ring inserts 30 and 32, are supported on conical surfaces 50 and 52 rather than on cylindrical surfaces. Therefore, both radial and axial expansion of the rings 30 and 32 tend to result in a loading in the axial direction. The rings 34 through 40 also provide expansion in the axial direction only by their axial thermal growth. The combined effect of the axial thermal expansion reacted by the spring is controlled by the ramp angle of the device formed by rings 42 and 44. The axial expansion causes the ring 42 to slide up the ramp surface 62 of the triangular ring insert 44, creating a circumferential compressive stress in ring 42 with a resulting axial load sufficient to counteract the total axial load generated. Therefore, the axial loading is counteracted by a spring-like force provided by the spring ring device. This counteracting spring force keeps the ring inserts fixed together and in their original position. This avoids any gaps downstream of the throat section of the nozzle which decreases the possibility of erosion in the plastic nozzle liner 48. Since axial expansion in the nozzle does not become a loading until it is restrained, the slippage between the rings 42 and 44 dissipates a selected portion of the expansion and converts the remaining portion of this expansion into the load necessary to prevent separation of the liner rings.

Thus, this arrangement of carbon insert rings forming the nozzle liner surface of an exit cone provides a load balancing system that is designed to reduce failures in the exhaust nozzles of rocket engines. This balancing effect is accomplished through the use of two of the ring inserts forming a spring ring device which counteracts the thermal expansion of the remaining ring inserts.

While the invention has been illustrated in connection with a rocket engine nozzle, it will be clear to those skilled in the art to which the invention pertains that it would have use in many installations other than that shown wherein an apparatus for counteracting axial loads due to thermal expansion is desired, and that many changes and modifications may be made thereto without departing from the scope of the invention.

I claim:
1. A rocket engine having a nozzle liner load balancing system, comprising, in combination, a combustion chamber, an exhaust nozzle located to receive hot propulsive gases from the combustion chamber, and a nozzle liner carbon ring insert support arrangement including a plurality of carbon ring inserts lining the exhaust nozzle to define a surface configuration, the ring inserts being shaped to absorb axial loading by thermal expansion thereof caused by the hot gases flowing through the nozzle, the last two downstream rings providing a ring spring device in which one ring has a conical surface mounted within a mating conical surface of the other, the angle of taper of the conical surfaces being such that one ring can be forced to slide axially into the other ring with elastic deformation of the rings, thereby absorbing the axial loading in the nozzle.

2. A rocket engine having a nozzle liner load balancing system, comprising, in combination, a combustion chamber, an exhaust nozzle located to receive hot propulsive gases from the combustion chamber, and a nozzle liner carbon ring insert support arrangement including a plurality of carbon ring inserts lining the exhaust nozzle to define a surface configuration, the ring inserts being shaped to absorb axial loading by thermal expansion thereof caused by the hot gases flowing through the nozzle, the upstream set of rings supported radially upon conical surfaces, the next set of rings supported radially upon cylindrical surfaces, and the last two downstream rings providing a ring spring device in which one ring has a conical surface mounted to slide within a mating surface of the other, thereby absorbing the axial loading on the nozzle.

3. A rocket engine having a nozzle liner load balancing system, comprising, in combination, a combustion chamber, an exhaust nozzle located to receive hot propulsive gases from the combustion chamber, and a nozzle liner carbon ring insert support arrangement including a plurality of carbon ring inserts lining the exhaust nozzle to define a surface configuration, the ring inserts being shaped to absorb axial loading by thermal expansion thereof caused by the hot gases flowing through the nozzle, the first two upstream rings supported radially upon conical surfaces, the next four rings supported radially upon cylindrical surfaces, and the last two downstream rings providing a ring spring device in which one ring has a conical surface mounted to slide within a mating conical surface of the other, thereby absorbing the axial loading on the nozzle.

References Cited by the Examiner
UNITED STATES PATENTS

| | | | |
|---|---|---|---|
| 3,032,982 | 5/1962 | Gaubatz | 60—35.6 X |
| 3,069,853 | 11/1962 | Eder | 60—35.6 |
| 3,133,411 | 5/1964 | McCorkle | 60—35.6 |
| 3,156,091 | 11/1964 | Kraus | 60—35.6 |
| 3,187,502 | 6/1965 | Stover | 60—39.66 X |

MARK NEWMAN, *Primary Examiner.*

CARLTON R. CROYLE, *Examiner.*

UNITED STATES PATENT OFFICE
CERTIFICATE OF CORRECTION

Patent No. 3,291,397 December 13, 1966

Kenneth O. Johnson

It is hereby certified that error appears in the above numbered patent requiring correction and that the said Letters Patent should read as corrected below.

Column 1, line 40, strike out "as a ring spring device to absorb the axial" and insert instead -- which are shaped to reduce axial loading by --; column 3, line 27, before "surface" insert -- conical --.

Signed and sealed this 26th day of September 1967.

(SEAL)
Attest:

ERNEST W. SWIDER  
Attesting Officer

EDWARD J. BRENNER  
Commissioner of Patents